R. B. PARKER.
ART OF RECOVERING LIGHT OILS.
APPLICATION FILED MAR. 6, 1916.
1,252,481.
Patented Jan. 8, 1918.
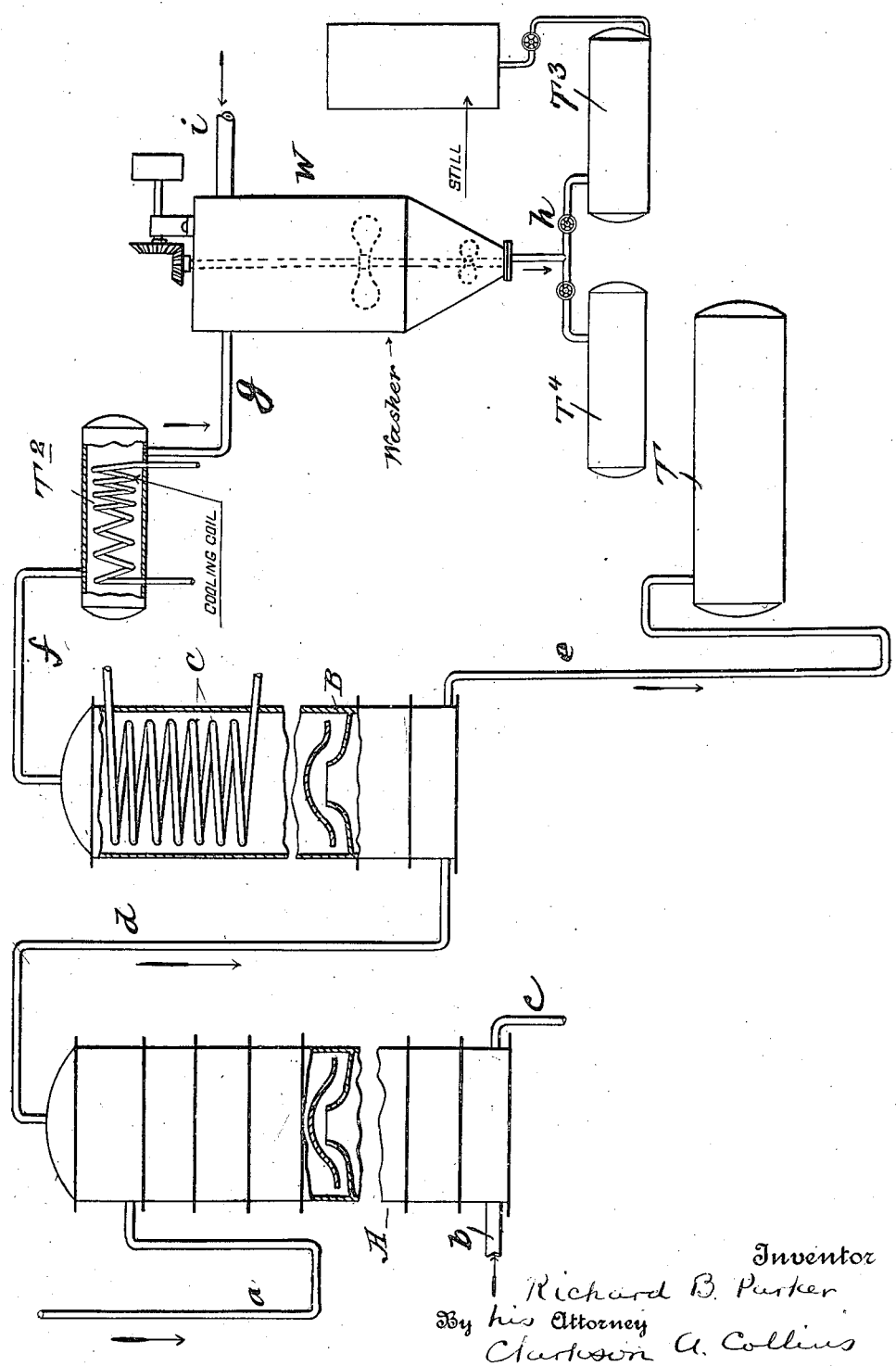
Inventor
Richard B. Parker
By his Attorney
Clarkson A. Collins

UNITED STATES PATENT OFFICE.

RICHARD B. PARKER, OF SOLVAY, NEW YORK, ASSIGNOR TO SEMET-SOLVAY COMPANY, OF SOLVAY, NEW YORK, A CORPORATION OF NEW YORK.

ART OF RECOVERING LIGHT OILS.

1,252,481.          Specification of Letters Patent.          Patented Jan. 8, 1918.

Application filed March 6, 1916. Serial No. 82,349.

*To all whom it may concern:*

Be it known that I, RICHARD B. PARKER, a citizen of the United States, residing at Solvay, in the county of Onondaga and State of New York, have invented certain new and useful Improvements in the Art of Recovering Light Oils, of which the following is a specification.

My invention relates specifically to the recovery in commercial form of those oils which are present primarily as vapors in the gases given off in the destructive distillation of coal, as in the operation of by-product retort coke ovens.

In the process of recovering such oils, as heretofore practised, the mixed oil vapors are first collected by passing the gas through and absorbing the oils in a suitable absorbent oil, as the so-called straw oil or other paraffin oil obtained in the distillation of petroleum, from which the oils, with certain accompanying impurities, are then distilled off and the mixed distillate condensed and collected. This condensate is then distilled to separate the light oils proper, benzol, toluol and xylols, from each other and from the components of higher boiling point which would be broken up by treatment with sulfuric acid, thus giving unrefined light oils.

Each of these is then washed with sulfuric acid to remove the unsaturated hydrocarbons and distilled to separate it from small proportions of components having other boiling points still remaining, to give pure products.

In contrast with this practice, in my process, while the light oils are collected from the gas in an absorbent oil and distilled off therefrom in the same manner as before, I treat the mixed vapors as they come from the still in the first instance to separate therefrom those components of higher boiling points, as olefins, &c., which would be broken up by treatment with sulfuric acid and condense and collect together the remaining vapors. This mixed condensate is then washed with sulfuric acid to remove the unsaturated hydrocarbons and afterward with an alkali to neutralize any adherent acid, and the washed product is then distilled to separate the light oils proper, benzol, toluol and xylols from one another and from any components of higher boiling points, each of the light oils being recovered in a pure state.

In this manner I am able to dispense entirely with one step of distillation, with consequent economy of operation, and moreover effect a considerable conservation of valuable product which has heretofore gone into the waste with the components having boiling points higher than the light oils.

My invention will be best understood by describing it in connection with the accompanying drawing which illustrates in diagrammatic form a portion of the apparatus which may be used in carrying it into effect.

Referring to the drawing, A indicates a still or column constructed in a well-known manner of superposed pans, into the upper part of which, as through a pipe, $a$, is admitted the absorbent oil, as straw oil, charged with the light oils to be recovered, and in which the light oils are distilled off from the absorbent oil as by means of steam admitted at the bottom of the column through a pipe, $b$.

The vapors distilled off pass from the still, A, by pipe $d$ directly to a dephlegmating column, B, which is provided in its upper portion with cooling means, as a cooling coil, C while the residuum of absorbent oil is drawn off through pipe $c$. In the column, B, the vapors are cooled to such an extent that those of highest boiling points, including the olefins, &c., which would be broken up by treatment with sulfuric acid are condensed in the column and pass out at the bottom, by pipe $e$, to a collecting tank T. The uncondensed vapors, including the light oils, pass out at the top of the column, B, as by pipe, $f$, and are thereafter condensed and collected, as in a tank $T^2$.

The mixed distillates in tank $T^2$ are then washed, as in a washer W, first with sulfuric acid to remove the unsaturated hydrocarbons present and afterward with an alkali, as a solution of caustic soda to remove any adherent acid. The washed product is then drawn off, as to a tank, $T^3$, while the washing acid is separately drawn off as to tank $T^4$.

The unsaturated hydrocarbons having thus been removed, the mixed condensates are distilled in any suitable or well-known manner to separate the light oils from each other and from such components of higher boiling points, such as naphthalene, as may be present.

In this manner the light oils are recovered as pure products with but a single distillation after they are driven off from the absorbent oil, with consequent economy of operation and completeness of recovery, the advantages of which will be readily understood by those skilled in the art.

Having thus described my invention, what I claim as new and desire to secure by Letters Patent is:—

1. The improvement in the art of recovering light oils from gas which consists in absorbing the oil vapors of the gas in an absorbent oil, distilling off the volatile components from the oil, condensing and separating from the more volatile components those of highest boiling points, including the olefins and the like, condensing together the remaining vapors and treating the condensate to remove the unsaturated hydrocarbons and finally distilling off and separately recovering the light oils.

2. The improvement in the art of recovering light oils from gas which consists in absorbing the oil vapors of the gas in an absorbing oil, distilling off the volatile components from the oil, separating by condensation from the more volatile components those of higher boiling points which would be broken up by treatment with sulfuric acid, condensing together the remaining vapors, washing the condensate with sulfuric acid and finally separating the purified product from the acid.

3. The improvement in the art of recovering light oils from gas which consists in absorbing the oil vapors of the gas in an absorbent oil, distilling off the volatile components from the oil, condensing and thereby separating from the more volatile components those of highest boiling points, including the olefins and the like, condensing together the remaining vapors, purifying the condensate by washing with sulfuric acid and finally separating the purified product from the acid.

In testimony whereof I have hereunto subscribed my name this 29th day of February, A. D. 1916.

RICHARD B. PARKER.